United States Patent [19]

Arsenius

[11] 3,753,604
[45] Aug. 21, 1973

[54] PRESSURE FLUID DISTRIBUTOR AT AN HYDROSTATIC BEARING

[75] Inventor: Torsten Henry Arsenius, Goteborg, Sweden

[73] Assignee: SKF Industrial Trading and Development Company, N.V., Amsterdam, Netherlands

[22] Filed: June 11, 1971

[21] Appl. No.: 152,068

[52] U.S. Cl. .................................... 308/160, 308/9
[51] Int. Cl. .......................................... F16c 17/06
[58] Field of Search ................ 308/5, 9, 122, 160, 308/168, 170; 137/99

[56] References Cited
UNITED STATES PATENTS

| 3,540,783 | 11/1970 | Cudnonufsky | 308/9 |
| 2,599,680 | 6/1952 | Weeks | 137/99 |
| 2,459,826 | 1/1949 | Martellotti | 308/122 |
| 2,949,924 | 8/1960 | Cochran | 137/99 |
| 2,695,198 | 11/1954 | Brugger | 308/122 |
| R27,228 | 11/1971 | Brundage | 308/122 |
| 2,695,199 | 11/1954 | Buzard | 308/9 |

FOREIGN PATENTS OR APPLICATIONS

| 74,991 | 7/1917 | Austria | 308/160 |
| 186,595 | 5/1923 | Great Britain | 308/9 |

Primary Examiner—Charles J. Myhre
Assistant Examiner—R. H. Lazarus
Attorney—Howson and Howson

[57] ABSTRACT

A hydrostatic bearing is provided with a number of pockets in its bearing surface, said pockets being supplied with a pressure fluid which actually carries the load and lubricates the bearing surface. Each pocket may be supplied with fluid from its own pump, but a simplified piping arrangement will be obtained if a common supply pump is used. In that case, however, there is a risk that a possible occasional displacement between the bearing parts will bring about an unexpectedly large outflow at one or some of the pockets, which will endanger the function of the bearing. The invention proposes the use of a distributor acting as a metering unit and consisting of a number of interconnected displacement pumps driven by the fluid. A tendency to increased leakage at one pocket, thus, will not mean a correspondingly increased flow through the distributor at the pertaining metering unit as the other units will brake the units tending to run more freely.

5 Claims, 3 Drawing Figures

INVENTOR:
TORSTEN HENRY ARSENIUS
BY Howson & Howson
ATTYS.

PRESSURE FLUID DISTRIBUTOR AT AN HYDROSTATIC BEARING

BACKGROUND OF THE INVENTION

The bearing surface of a hydrostatic bearing is provided with a number of pockets, which are supplied with pressure fluid. With certain types of bearings, where a high degree of accuracy is required, it is common to supply each pocket with fluid from its own pump. This, of course, is expensive and necessitates a complicated piping. It is, however, also possible to supply all, or a group of pockets, from a common pump; but during a possible relative displacement of the bearing components along the bearing surface the clearance which determines the ordinary leakage of pressure fluid may be altered, whereby an exceptionally large quantity of fluid may flow out through one of the interconnected pockets. The function of the bearing may then be jeopardized as the fluid pressure within the bearing may sink too much.

A possibility to remove this disadvantage is according to the invention obtained by introducing a device into the pressure conduit from the pump supplying the pressure fluid, said device comprising a number of metering units designed as displacement pumps, preferably gear pumps, which are interconnected in such a manner, that the relationship between the quantities delivered by the different pumps is maintained in the supply conduits leading from the metering units to the individual pockets, and said metering units being driven by the fluid delivered by the pump.

BRIEF DESCRIPTION OF THE DRAWINGS

The invention will below be described with reference to the accompanying drawings, which show the invention as utilized with three types of hydrostatic bearings, each provided with four pockets in its bearing surface.

DESCRIPTION OF THE PREFERRED EMBODIMENTS

Figure 1:
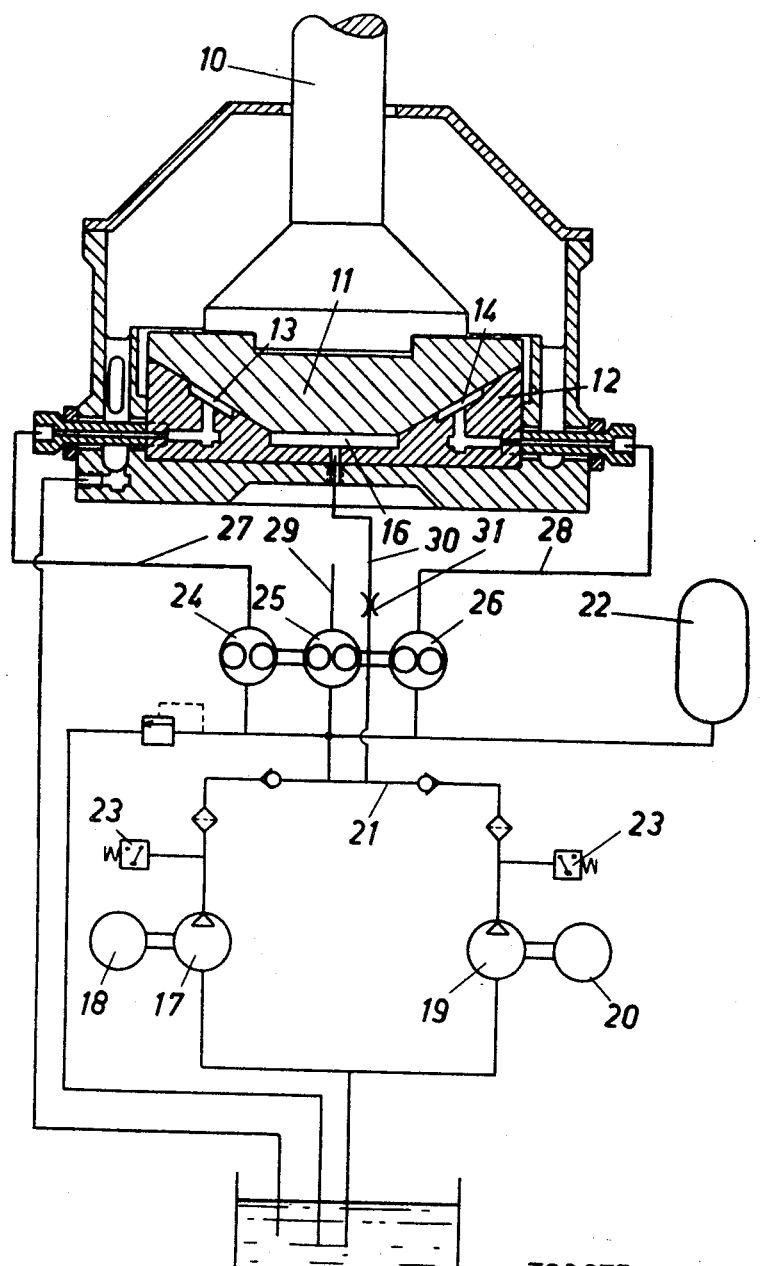
FIG. 1 is a view partly in section of a first embodiment of a hydrostatic bearing in accordance with the present invention.

The bearing shown in FIG. 1 is designed to carry a machine element, which is supported by a shaft 10. The bearing comprises a rotatable member 11, connected to the shaft, said member cooperating with a fixed cup-shaped bearing part 12. In the bearing surface between the latter and the rotatable member four pockets 13, 14, 15 and 16 are provided. The last-mentioned one is arranged centrally below component 11, while the three first-mentioned pockets, which each is kidney-shaped, are arranged as an annulus concentrically enclosing the central pocket 16. The latter carries a major part of the load but cannot govern the parts of the bearing. The outer pockets, which are located higher up along the vaulted surface, beside carrying part of the load, will also exert a governing action upon the rotatable member.

A pressure fluid is supplied to the bearing by means of a pump installation comprising a first pump 17 and a motor 18 driving the same, as well as a reserve pump 19 and a motor 20 the latter. The pressure conduits from the two pumps are provided with customary non-return valves and are connected to a common pressure conduit 21. The bearing is on the present occasion designed to work with a fluid having a pressure of about 100 atmospheres and the pipe-work contains an accumulator 22, which has sufficient capacity to maintain the desired pressure in the system during the short interval required to switch off a defective pump and to bring the reserve pump into action. The pressure conduit from each pump is provided with a pressure sensitive device 23, which automatically switches in the occasionally inactive pump if the pressure in the conduit from the active pump fluid should sink below a predetermined value.

The common pressure pipe 21 is connected to a distributing device adapted to govern the flow of fluid to the pockets 13, 14 and 15. This device comprises a number of positive displacement pumps, on this occasion gear pumps, which act as metering units 24, 25, 26 the shafts of which are interconnected. Unit 24 is by way of a conduit 27 connected to pocket 13, unit 26 is by way of conduit 28 connected to pocket 14, and unit 25 is by way of conduit 29 connected to the third pocket 15, which does not appear in the section shown in FIG. 1. The metering units are driven by the fluid delivered by the supply pump and will thus emit a certain quantity to each of the conduits 27–29. If the clearance at one of the pockets should occasionally be increased due to a relative displacement of the components of the bearing, the resistance to flow will be changed and the fluid should obtain a tendency to flow out through this pocket. The distributor will, however, make all metering units rotate with this same speed, and will thus not permit more fluid to pass out through the temporarily more open conduit, than through the two other conduits.

The central pocket 16 is here supplied with fluid through a conduit 30, which is connected directly to pressure conduit 21. Conduit 30 is provided with a throttling member 31, which independently of the occasional working conditions at the distributor will govern the flow to the central pocket.

Figure 2:
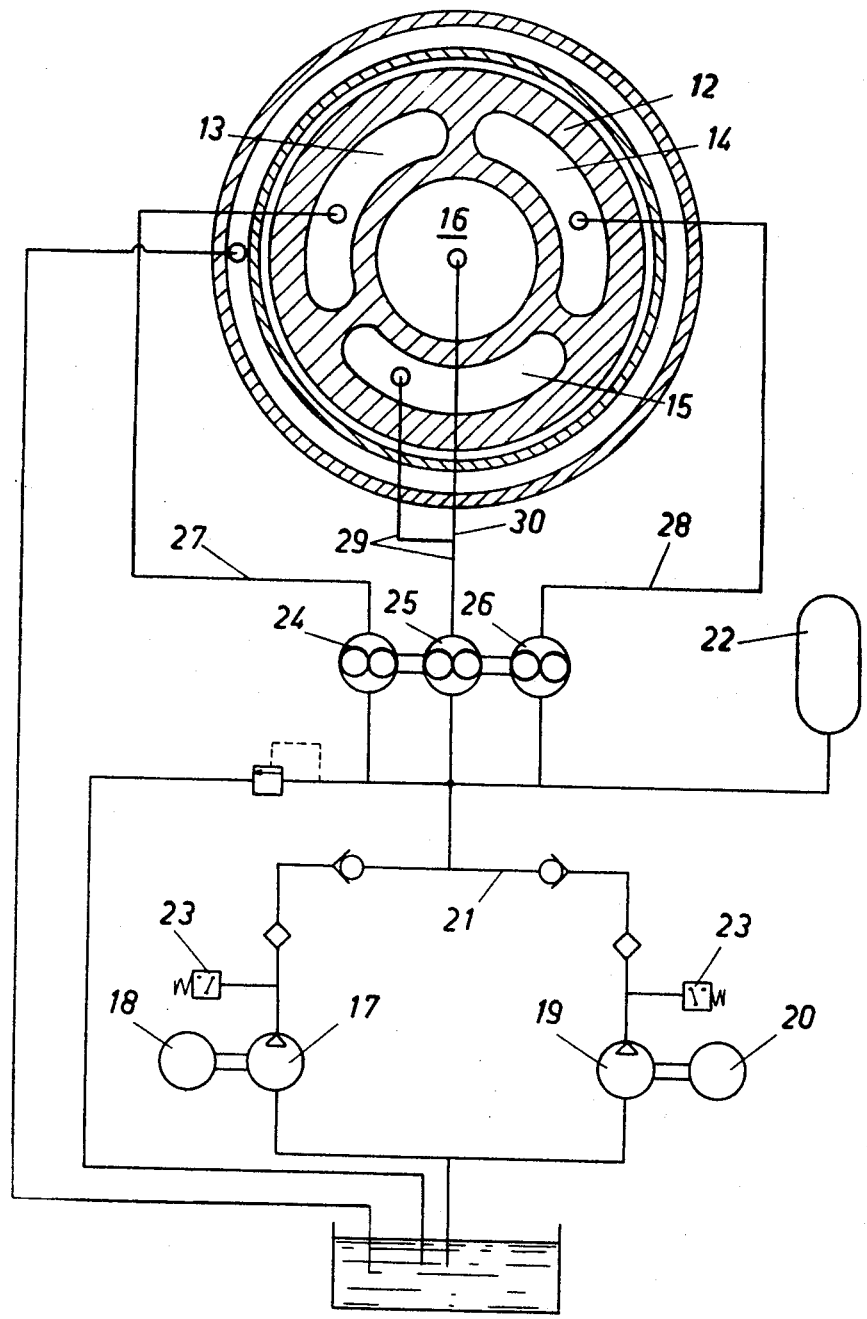
FIG. 2 is a view partly in section of a second embodiment of a hydrostatic bearing in accordance with the present invention.

The embodiment shown in FIG. 2 corresponds in essential details to the embodiment in FIG. 1. The fixed bearing part 12 is here shown as viewed from above and it is evident that on this occasion the conduit 30 to the central pocket 16 is connected to conduit 29 leading to the kidney-shaped pocket 15. The central pocket will carry a substantial part of the axial load, and its working condition is not influenced very much by a possible lateral displacement of the shaft. The displacements considered here are actually very small, and on many occasions the pipework may become easier by connecting the central pocket to one of the kidney-shaped pockets.

Figure 3:
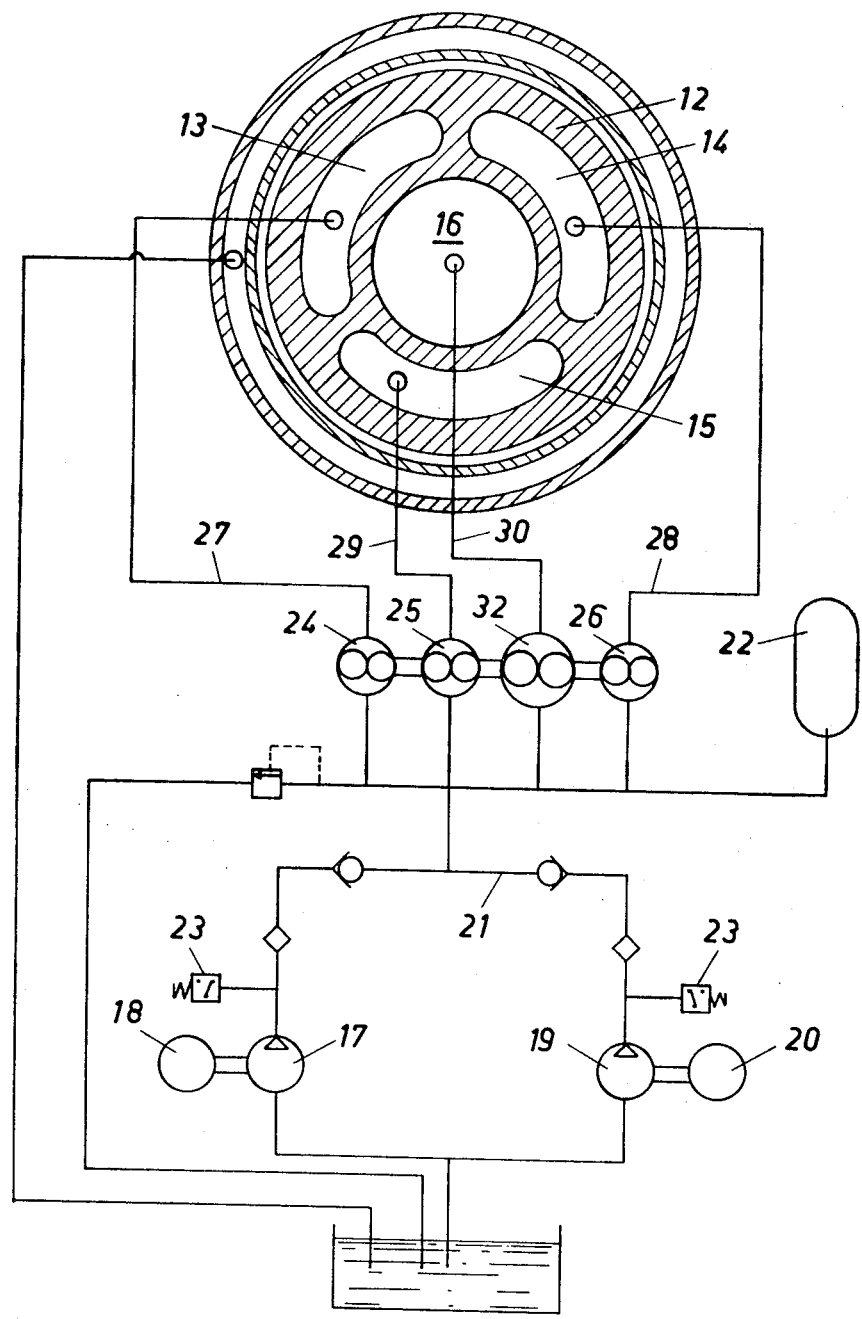
FIG. 3 is a view partly in section of a third embodiment of a hydrostatic bearing in accordance with the present invention.

The embodiment according to FIG. 3 substantially corresponds to that of FIG. 2 and the same reference numerals are used. Here, however, the central pocket 16 is supplied with fluid from a metering unit of its own 32. This is slightly bigger than the other metering units. The units do not have to be uniform, the main thing is that they maintain the proporation between the branch flows so that each pocket is supplied with a quantity suited to the need therein.

The metering units have been shown as gear pumps, but it is evident that vane pumps, screw pumps or any other known type of displacement pumpts, suited to be driven by the fluid supplied by the main pump, may be used.

I claim:

1. A hydrostatic bearing comprising two bearing parts defining therebetween a bearing surface, a portion of said bearing surface forming part of a sphere, means defining a plurality of pockets in one of said parts opening into said bearing surface, said pockets consisting of one which is centrally disposed in the bearing surface and at least two which are kidney shaped and arranged along an annulus concentrically enclosing said centrally located pocket in the spherical portion of the bearing surface, means for supplying a pressure fluid to said pockets including a supply pump and distributor means for maintaining a predetermined relationship between the fluid quantities supplied to the individual pockets, said distributing device comprising one displacement pump for each of said kidney-shaped pockets, said displacement pumps being interconnected by means of a common shaft and disposed in a supply conduit from the supply pump.

2. A hydrostatic bearing as claimed in claim 1 wherein the central pocket is connected to a conduit leading from one of the metering pumps to one of the kidney-shaped pockets.

3. A hydrostatic bearing as claimed in claim 1 including a separate metering pump connected to the centrally located pocket which has a greater capacity than the metering pumps connected to the kidney-shaped outer pockets.

4. The hydrostatic bearing according to claim 1, in which the metering units are designed as gear pumps.

5. The hydrostatic bearing according to claim 1, in which a throttling member is fitted into the conduit leading to the centrally located pocket.

* * * * *